US008726380B2

(12) United States Patent
de los Reyes et al.

(10) Patent No.: US 8,726,380 B2
(45) Date of Patent: *May 13, 2014

(54) METHODS, DEVICES, SYSTEMS, AND COMPUTER PROGRAM PRODUCTS FOR EDGE DRIVEN COMMUNICATIONS NETWORK SECURITY MONITORING

(71) Applicant: AT&T Intellectual Property I, L.P., Reno, NV (US)

(72) Inventors: Gustavo de los Reyes, Fair Haven, NJ (US); Thusitha Jayawardena, Holmdel, NJ (US); Gang Xu, Piscataway, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/663,202

(22) Filed: Oct. 29, 2012

(65) Prior Publication Data

US 2013/0055343 A1    Feb. 28, 2013

Related U.S. Application Data

(63) Continuation of application No. 12/627,733, filed on Nov. 30, 2009, now Pat. No. 8,302,189.

(51) Int. Cl.
    *G06F 21/00*    (2013.01)
(52) U.S. Cl.
    USPC ............... 726/22; 726/1; 455/443; 709/224
(58) Field of Classification Search
    None
    See application file for complete search history.

(56) References Cited

U.S. PATENT DOCUMENTS

| | | | |
|---|---|---|---|
| 7,779,119 B2 * | 8/2010 | Ginter et al. | 709/224 |
| 2008/0082662 A1 * | 4/2008 | Dandliker et al. | 709/225 |
| 2009/0178109 A1 * | 7/2009 | Nice et al. | 726/1 |
| 2010/0125912 A1 * | 5/2010 | Greenshpon et al. | 726/25 |

* cited by examiner

*Primary Examiner* — Fikremariam A Yalew
(74) *Attorney, Agent, or Firm* — Myers Bigel Sibley & Sajovec, PA

(57) ABSTRACT

An edge monitoring approach can be utilized to detect an attack which includes a plurality of relatively low bandwidth attacks, which are aggregated at a victim sub-network. The aggregated low bandwidth attacks can generate a relatively high bandwidth attack including un-solicited data traffic directed to the victim' so that the aggregated attack becomes more detectable at an edge monitor circuit located proximate to the victim. Related systems, devices, and computer program products are also disclosed.

17 Claims, 4 Drawing Sheets

METHODS, DEVICES, SYSTEMS, AND COMPUTER PROGRAM PRODUCTS FOR EDGE DRIVEN COMMUNICATIONS NETWORK SECURITY MONITORING

RELATED APPLICATION

This application is a continuation of U.S. application Ser. No. 12/627,733, filed Nov. 30, 2009, now U.S. Pat. No. 8,302,189, the disclosure of which is hereby incorporated herein by reference as if set forth in its entirety.

BACKGROUND

Conventional network security management systems may be centralized, so that network traffic is routed to a central intelligence system that may perform security analysis and enforces security policy. Low-rate distributed attacks may be difficult to detect with these types of systems and, even if detected, the response may be slow.

In some situations, hackers may take control of a home system to launch other attacks on the Internet or even on the home system's Internet Service Provider (ISP). The latter case may be serious as the ISP usually provides certain access privileges to its customers that may not be obtained by external users. Further, the greater the computing power and bandwidth of the home system, the more severe the attacks may be.

SUMMARY

Embodiments according to the invention can provide methods, devices, systems, and computer program products for providing security for a communications network including monitoring, using a programmed computer processor circuit, data at an edge of the communications network, that is outside a backbone of the communications network, the data being received at the edge from outside the backbone of the communications network, determining, at the edge, that the data being monitored at the edge comprises a security threat to the communications network, reporting the data determined at the edge to be a security threat to a Central Management System (CMS) associated with the backbone, and blocking the data at the edge responsive to determining at the edge that the data is a security threat to the communications network.

Other methods, devices, systems, and/or computer program products according to other embodiments will be or become apparent to one with skill in the art upon review of the following drawings and detailed description. It is intended that all such additional systems, devices, methods, and/or computer program products be included within this description and be protected by the accompanying claims.

DETAILED DESCRIPTION OF EMBODIMENTS

Figure 1:
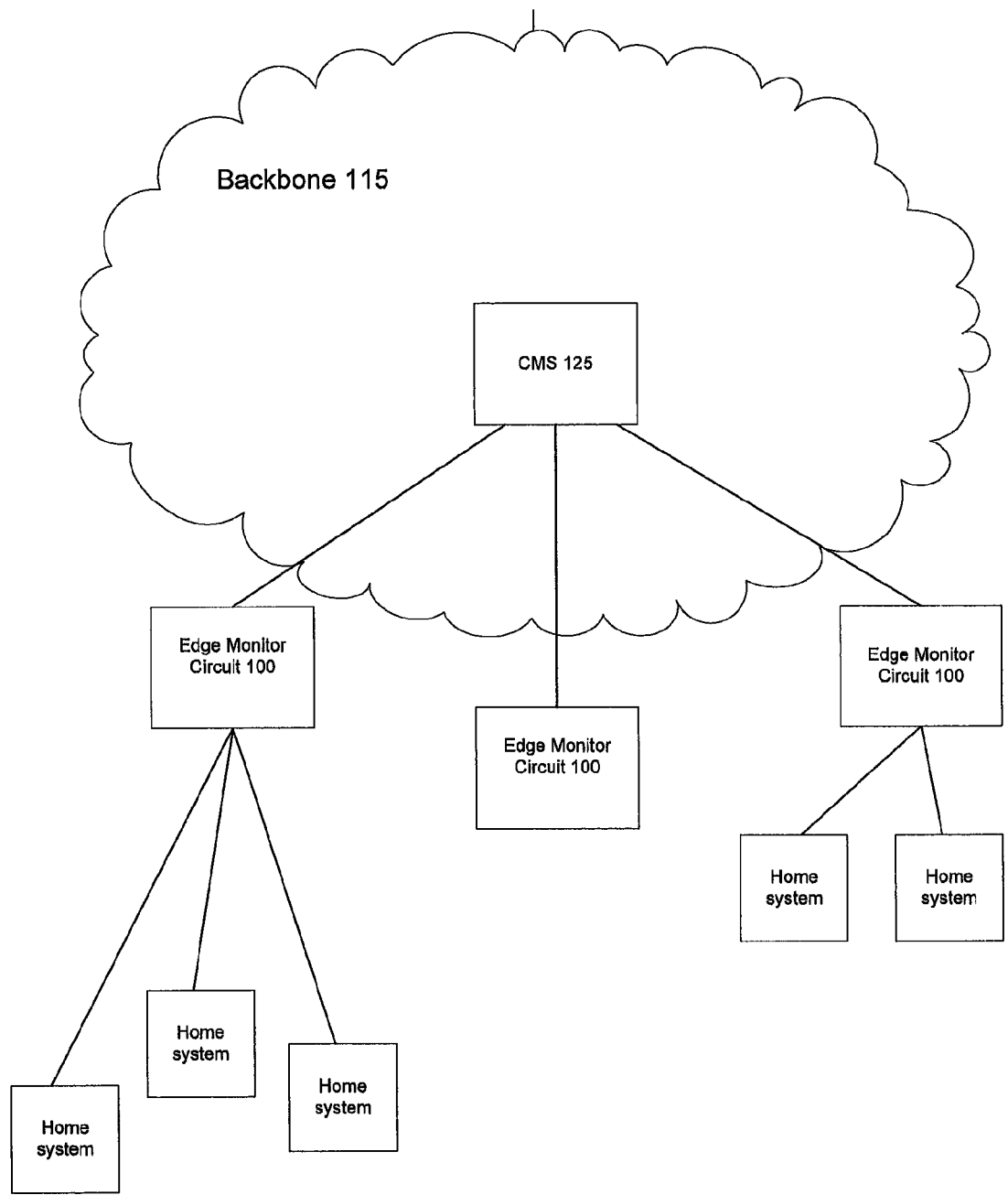
FIG. 1 is a schematic representation of an ISP controlled network including a backbone, a Central Management System (CMS), and edge monitor circuits connected to sub-networks associated with customer premises and served by the ISP in some embodiments.

Methods for providing edge driven communications security monitoring as well as related systems, devices, and computer program products, will now be described more fully hereinafter with reference to the accompanying drawings, in which illustrative embodiments are shown. However, it will be appreciated that these methods for providing edge driven communications security monitoring, as well as related devices, systems and computer program products, may be embodied in many different forms, and thus the present application should not be construed as limited to the embodiments set forth herein. Rather, these embodiments are provided so that this disclosure will be thorough and complete, and to fully convey the scope of the embodiments to those skilled in the art. Like numbers refer to like elements throughout.

The terminology used herein is for the purpose of describing particular embodiments only and is not intended to be limiting of the embodiment. As used herein, the singular forms "a", "an," and "the" are intended to include the plural forms as well, unless the context clearly indicates otherwise. It will be further understood that the terms "comprises," "comprising," "includes," and/or "including," when used herein, specify the presence of stated features, steps, operations, elements, and/or components, but do not preclude the presence or addition of one or more other features, steps, operations, elements, components, and/or groups thereof.

It will be understood that when an element is referred to as being "coupled," "connected," or "responsive" to another element, it can be directly coupled, connected, or responsive to the other element, or intervening elements may also be present. In contrast, when an element is referred to as being "directly coupled", "directly connected," or "directly responsive" to another element, there are no intervening elements present. Like numbers refer to like elements throughout. As used herein the term "and/or" includes any and all combinations of one or more of the associated listed items.

It will be understood that, although the terms first, second, etc. may be used herein to describe various elements, these elements should not be limited by these terms. These terms are only used to distinguish one element from another. Thus, a first element could be termed a second element without departing from the teachings of the present embodiments.

Unless otherwise defined, all terms (including technical and scientific terms) used herein have the same meaning as commonly understood by one of ordinary skill in the art to which this embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will further be appreciated by one of skill in the art, the present embodiments may be methods, devices, systems, and/or computer program products. Accordingly, embodiments may be entirely hardware, entirely software, or a combination of software and hardware aspects. Furthermore, embodiments may take the form of a computer program product on a computer-readable storage medium having computer-usable program code embodied in the medium. A non-exhaustive list of specific examples of the computer-readable storage medium would include the following: a portable computer diskette, a random access memory (RAM), a read-only memory (ROM), an erasable programmable read-only memory (EPROM or Flash memory), and a portable compact disc read-only memory (CD-ROM) or digital versatile disc (DVD). Any suitable computer-readable storage medium may be utilized including hard disks, CD-ROMs, optical storage devices, or magnetic storage devices.

Embodiments are also described using flowchart illustrations and block diagrams. It will be understood that each block (of the flowcharts and block diagrams), and combinations of blocks, can be implemented by computer program instructions. These program instructions may be provided to a processor circuit, such as a microprocessor, microcontroller, or other processor, such that the instructions which execute on the processor(s) create means for implementing the functions specified in the block or blocks. The computer program instructions may be executed by the processor circuit(s) to cause a series of operational steps to be performed by the processor circuit(s) to produce a computer implemented process such that the instructions which execute on the processor circuit(s) provide steps for implementing the functions specified in the block or blocks.

Accordingly, the blocks support combinations of means for performing the specified functions, combinations of steps for performing the specified functions, and program instruction means for performing the specified functions. It will also be understood that each block, and combinations of blocks, can be implemented by special purpose hardware-based systems which perform the specified functions or steps, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Computer program code or "code" for carrying out operations in embodiments may be written in a procedural language provided by a database environment, such as PL/SQL in an Oracle database or Transact-SQL in Microsoft or Sybase databases, and/or a programming language such as Java, C++, JavaScript, Visual Basic, Perl, or in various other programming languages. Software embodiments do not depend on implementation with a particular programming language. The code, or portions thereof, may execute entirely on one or more servers, or it may execute partly on a server and partly on a client within a client device or as a proxy server at an intermediate point in a communications network. In the latter scenario, the client device may be connected to a server over a LAN or a WAN (e.g., an intranet), or the connection may be made through the Internet (e.g., via an Internet Service Provider). It is understood that the present embodiments are not TCP/IP-specific or internet-specific. Exemplary embodiments may be implemented using various protocols over various types of computer networks.

In some embodiments, an edge monitoring approach can be utilized to detect an attack which includes a plurality of relatively low bandwidth attacks, which are aggregated at a victim sub-network. The aggregated low bandwidth attacks can generate a relatively high bandwidth attack including un-solicited data traffic directed to the victim so that the aggregated attack becomes more detectable at an edge monitor circuit located proximate to the victim.

In some embodiments, a Central Management System (CMS) cooperates with the edge monitor circuits to provide security for the communications network. For example, the CMS may be associated with the backbone of the network and be primarily responsible for detecting relatively high bandwidth (non-aggregated) attacks, whereas the edge monitor circuits (associated with respective sub-networks connected to the backbone) can be used as described above to detect the relatively low bandwidth aggregated attacks. Further, the edge monitor circuits determining, at an edge of the network, that the data being monitored at the edge is a security threat to the communications network, and then report the data determined at the edge to be a security threat to CMS. In turn, the edge monitor circuit may block the data traffic determined to be a security threat at the edge in accordance with a security policy promulgated by the CMS, and further, CMS may propagate an updated security policy to the edge monitor circuits.

FIG. 1 is a schematic representation of an ISP controlled network 110 including a backbone 105 of the network 110 including a Central Management System (CMS) 125 coupled to a backbone 115 of the network 110 and edge monitor circuits 100 connected to victim home systems 120 associated with customer premises in some embodiments. It will be understood that the CMS 125 is a cloud based system that analyzes network data traffic and can make security policy decisions for the entire network 110. In some embodiments, security functions are shared and distributed between CMS 125 and the edge monitor circuits 100, where the CMS 125 can delegate some of the monitoring and determination functions to the edge monitor circuits 100, such as when the detection of relatively low rate attacks is delegated to the edge monitor circuits 100 and the CMS 125 is left with the task of detecting relatively high rate attacks.

In some embodiments, the CMS 125 can coordinate different dedicated management systems such as anti-virus, anti-spam and content (web) protection, as well as the edge monitor circuits 100. These dedicated systems can perform protocol specific analysis and generate alerts in response to that analysis. These alerts, as well as some sample traffic data (either raw or aggregated), may be provided to the CMS 125, whereupon the CMS 125 may update en existing security policy to create an updated security policy based on the alerts, which may then be transmitted to the edge monitor circuits 100 for enforcement at the edge (such as to block data at the edge of the network 110, which would have otherwise been transmitted to an identified victims).

As described above and as further shown in FIG. 1, the edge monitor circuit 100 can be located at, or proximate to, the edge of the ISP controlled network 110. The edge monitor circuit 100 can monitor both inbound and outbound traffic to/from the ISP backbone 205 at the edge to determine whether a pattern of data may be a security threat. As appreciated by the present inventors, the detection and mitigation of attacks by the edge monitor circuits 100 can complement operations of the CMS 125. Since the edge monitor circuits 100 monitor local traffic, the likelihood of detecting certain attacks may be improved. For example, in a low-rate Distributed Denial of Service (DDoS) attack, the overall aggregated attacking traffic may be only a few Mega-bits per second, which may be too low for the CMS 125 to detect. The edge monitor circuit 100 connected to the backbone may, however, detect the data traffic which aggregates at the victims, and ultimately identify the attack.

Further, once an attack is detected, the security policies distributed by the CMS 125 may help stop an attack at the edge of the network earlier than otherwise would be accomplished by a stand-alone centralize approach. This quick reaction to attacks may prevent attacking traffic from entering the ISP network 110, which may save ISP bandwidth. Further, if the targeted victim of attack is an ISP component, the farther the attack can be pushed away from the target, the less likely that ISP service may be impacted. For example, a spammer may try to flood the ISP's mail server with un-solicited traffic, which may be block by the ISP's anti-spam system, but the backbone itself may strained under heavy attacking traffic. In contrast, having the edge monitor circuits 100 block the spam emails at the edge of the network 110 may reduce the adverse effects on the ISP's network 110.

Figure 2:
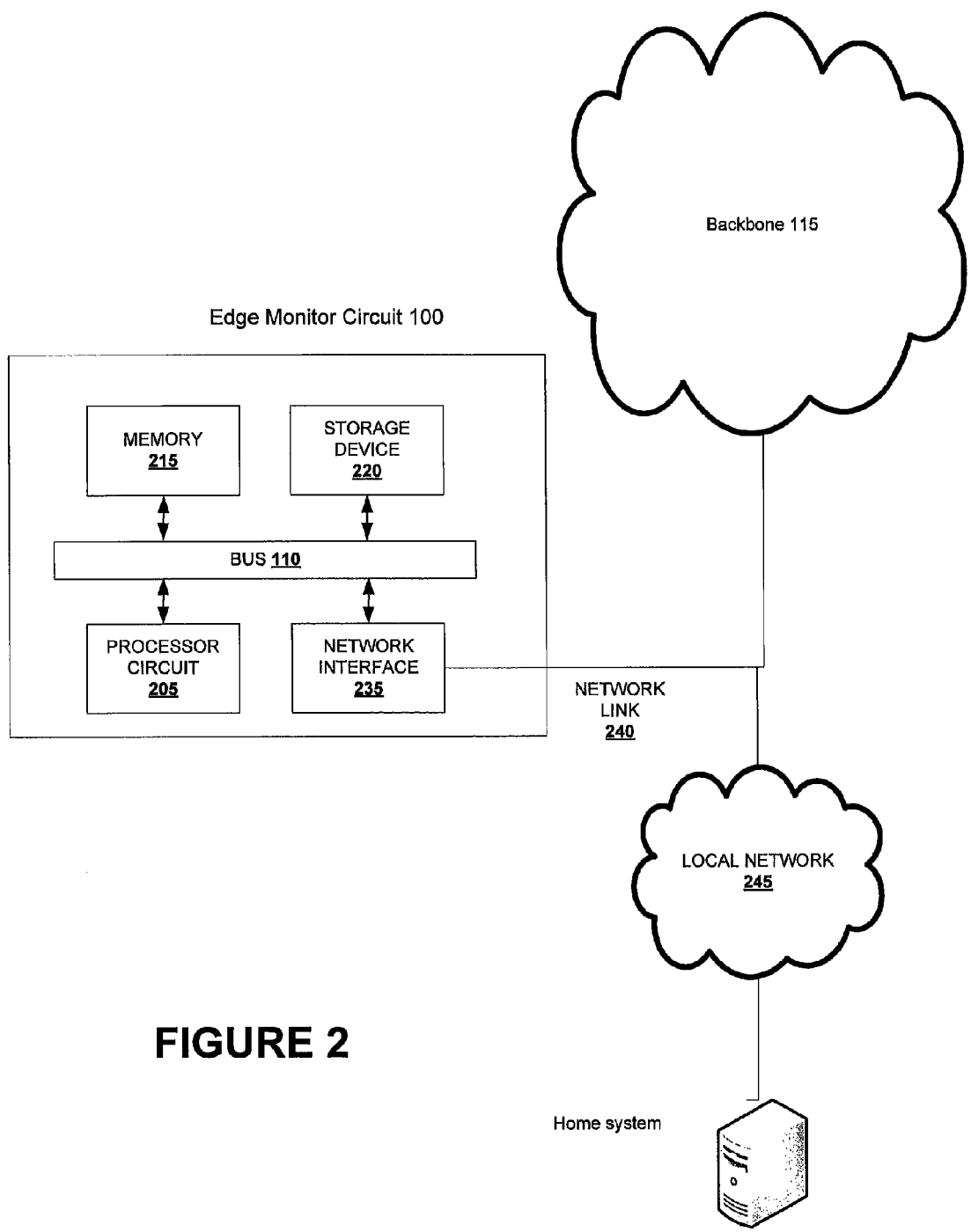
FIG. 2 is a block diagram illustrating an edge monitor circuit which can provide methods, devices, systems, and computer program products described herein operating in a network illustrated in FIG. 3.
Figure 3:
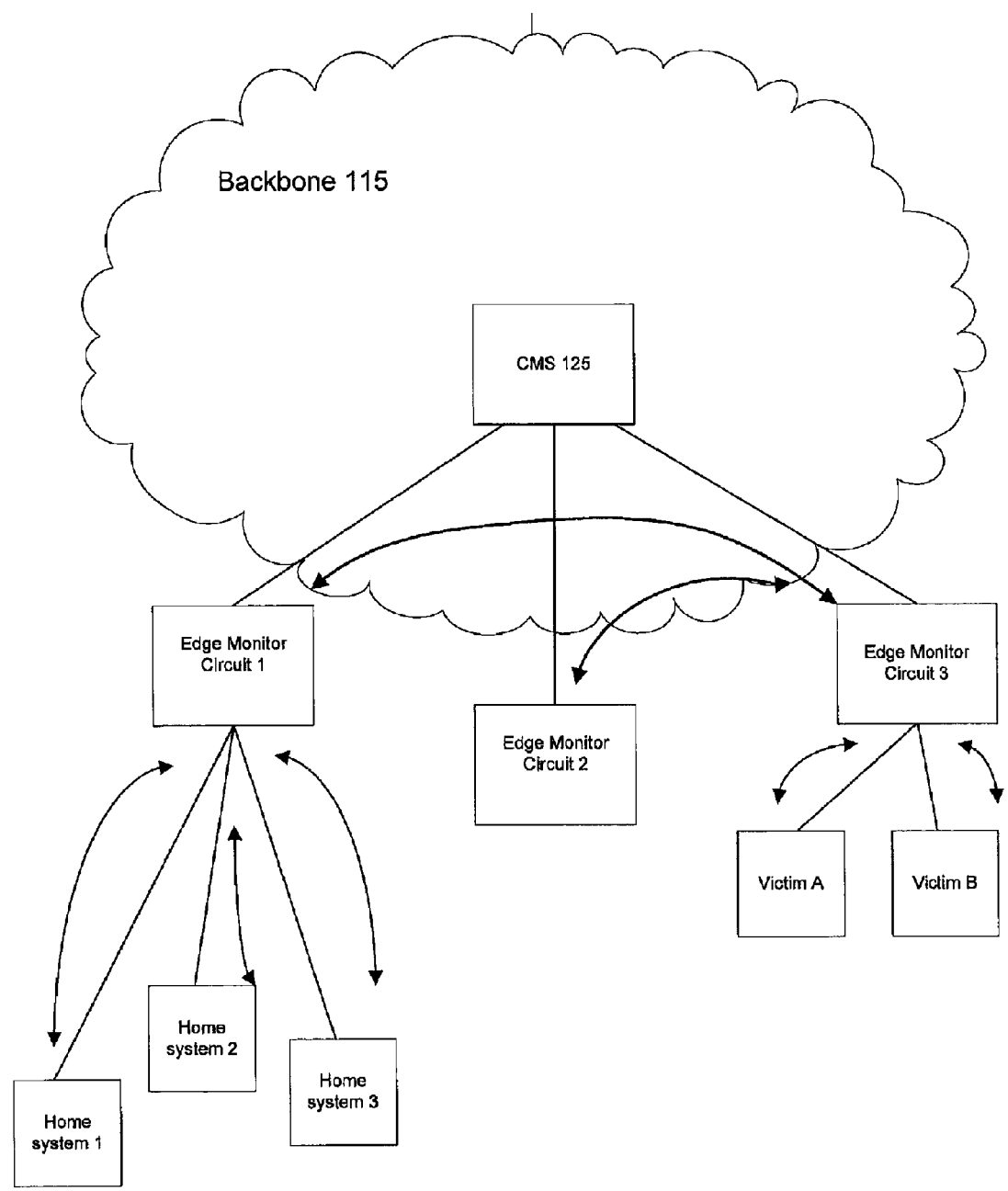
FIG. 3 is a schematic representation of an ISP controlled network including a backbone of the network including a Central Management System (CMS) and edge monitor circuits connected to victim sub-networks associated with customer premises in an exemplary attack in some embodiments.

FIG. 2 is a block diagram illustrating an edge monitor circuit 100 on which the methods, devices, systems, and computer program products described herein may be used in the network 110 illustrated in FIGS. 1 and 3. The edge monitor circuit 100 may be any device or system that is capable of monitoring and analyzing data traffic flowing into and/or out of the backbone 115 of the ISP controlled network. The edge monitor circuit 100 can be located anywhere outside the ISP's backbone 115 toward the edge of the ISP's network 110. For example, in some embodiments, the edge monitor circuit 100 is located outside the backbone 115 within the last ISP controlled device that is in communication with the home systems at a customer's premises. In other embodiments, the edge monitor circuit 100 is located within the first ISP controlled device outside the backbone 115 toward the customer's premises. In some embodiments, the edge monitor circuit 100 is included in what is sometimes referred to as a peer router that is connected to a third party ISP network. It will be understood that in some embodiment, a security threat can be sourced from the third party ISP's network.

The edge monitor circuit 100 is configured to implement a security function promulgated to the edge monitor circuits 100 by the CMS 125. The security function can include information regarding traffic patterns and the like which can be used to determine that particular data may be a security threat. The security function can also include a security policy associated with the security threats. In some embodiments, the security policy associated with the security threats is to block data transfer directed to a victim's address via the edge monitor circuit 100.

Referring still to FIG. 2, the edge monitor circuit 100 may include a processor circuit 205 for processing commands and information, and which may be communicatively coupled to a bus 210. The processor circuit 205 may be embodied, for example, as one or more enterprise, application, personal, pervasive, and/or embedded computer systems and/or special purpose hardware that is connected to the ISP's network 100.

Edge monitor circuit 100 may also include main memory 215 communicatively coupled to bus 210. Main memory 215 may include a random access memory (RAM) and/or other volatile storage devices for storing executing applications or intermediate information during execution of instructions by the processor circuit 205, and/or a read-only memory (ROM) or other non-volatile storage device for storing static information and instructions for processor circuit 205.

The edge monitor circuit 100 may further include a storage device 220, such as a hard disk drive or other magnetic media device, a compact disc (CD) or DVD drive or other optical media device, or a flash drive or other solid-state device, communicatively coupled to the bus 210. Storage device 220 may be used to store instructions and data for processing by processor circuit 205. Edge monitor circuit 100 may be communicatively coupled via the bus 210 to a display (not shown). and to an input device (not shown), both of which may be used to provide control/set up information to the edge monitor circuit 100.

Edge monitor circuit 100 may also include a network interface 235 communicatively coupled to the bus 210. The network interface 235 may provide a bi-directional data communication connection via a network link 240 to a local network 245. network link 140, which may provide data communication to/from the home system 250 via a sub-network at the customer premises.

The invention is related to the use of the edge monitor circuit 100 for implementing the methods, devices, systems, and/or computer program products described herein. According to some embodiments of the invention, the methods are performed by edge monitor circuit 100 in response to processor circuit 205 executing one or more sequences of one or more instructions contained in main memory 215. Such instructions may be read into main memory 215 from another computer-readable medium, such as storage device 220. Execution of the sequences of instructions contained in main memory 215 causes processor circuit 205 to perform the steps described herein. In alternative embodiments, hardware circuitry may be used in place of or in combination with software instructions to implement the invention. Thus, embodiments of the invention are not limited to any specific combination of hardware circuitry and software. Moreover, it will be appreciated by one of skill in the art that embodiments of the invention may be implemented on a single edge monitor circuit 100, or on multiple edge monitor circuits 100.

Figure 4:
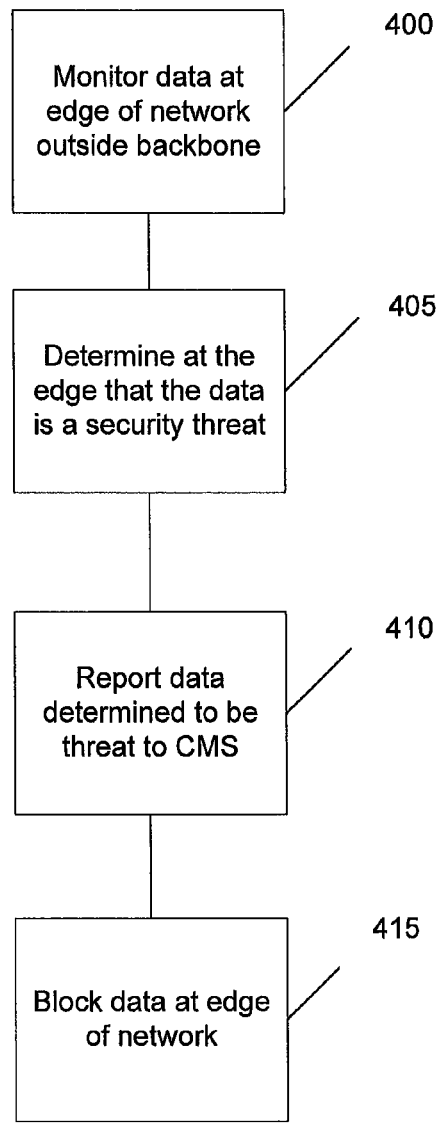
FIG. 4 is a flowchart that illustrates operations of edge monitor circuits 100 and the CMS during the exemplary attack illustrated in FIG. 3.

FIG. 3 is a schematic representation of the ISP controlled network 110 including the backbone 115 of the network 110 including the CMS 125 and the edge monitor circuits 100 connected to victim home systems 1-3 connected to sub-networks associated with customer premises in an exemplary attack. FIG. 4 is a flowchart that illustrates operations of edge monitor circuits 100 and the CMS 125 during the exemplary attack illustrated in FIG. 3.

According to FIG. 3, home systems 1-3 are outside the backbone 115 and are infected with, what are sometimes referred to as, bots controlled by an attacker to direct enough unsolicited data across the network to victims A and B (located proximate to an edge of the network). Further, the attack includes data sourced from a third party ISP controlled network. The aggregation of data from the bots and from the third party ISP may be enough to otherwise deny a victim service by the ISP unless the attack is blocked.

For example, the attacker can control the bots to run a UDP flood to SIP port (5060) in order to generate a denial-of-service attack on a single or large number of victims (such as a UDP flood to deny VOIP service to the victim's home system. In an effort to reduce the protection otherwise offered by the ISP against denial-of-service attacks, as well as to prevent the bots from being detected, each bot may generate a relatively low volume of traffic as part of the attack, such as 10 k bps, and may target relatively few victims. The attack may also change the victim base to cause greater damage and to decrease the likelihood of detection.

According to FIGS. 3 and 4, the total aggregated traffic generated by bots infecting home systems 1-3 may be 30K bps, which is monitored by the edge monitor circuit 1. However, this aggregated traffic may be too low to be detected by the edge monitor circuit 1 or by the CMS 125 (Block 400). Accordingly, the data traffic sourced by bots in home systems 1-3 is part of the attack, but is not detected as the data is transmitted from the home systems 1-3 to victims A and B via the ISP controlled backbone 115. Further, the attack also includes data traffic sourced from the third party ISP controlled network, which is monitored entering the ISP controlled network 110 at the edge monitor circuit 2.

The attack data traverses the ISP backbone 115, and is aggregated at the victims A and B, but is also monitored via the edge monitor circuit 3. The aggregated data (including that from other home bots and from the third party ISP controlled network) may increase to, for example 5M bps, which may still be too low for detection by the CMS 125. When the attack traffic aggregates at the edge monitor circuit 3 (monitoring data to/from the victims A and B) the attack may be detected as 5 M bps and may be significant relative to typical data traffic experienced by the home systems associated with victims A and B.

Accordingly, the edge monitor circuit 3 may determine that the data traffic at the edge may be a security threat (Block 405) and can, therefore, temporarily block the data until it is determined whether the data represents a likely attack based on the current security policy maintained by the edge monitor circuit 100. In the meantime, an alert is triggered, whereupon the edge monitor circuit 100 reports the security threat to the CMS 125 (Block 415). The CMS 125 receives the alert, and determines that the data blocked by the edge monitor circuit 3 is a likely security threat, and generates an updated security policy to block any traffic directed to victims A and B. The CMS 125 then transmits the updated security policy to all edge monitor circuits 1-3. The edge monitor circuit 1 receives the updated security policy and identifies the data pattern determined to be the security risk. The data is then blocked at the edge of the network at home systems 1-3 (Block 420). In some embodiments, the edge monitor circuit 1 may notify the home owners of the security risk and blocking action.

As described herein, in some embodiments, an edge monitoring approach can be utilized to detect an attack which includes a plurality of relatively low bandwidth attacks, which are aggregated at a victim sub-network. The aggregated low bandwidth attacks can generate a relatively high bandwidth attack including un-solicited data traffic directed to the victim' so that the aggregated attack becomes more detectable at an edge monitor circuit located proximate to the victim.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed various embodiments and, although specific terms are employed, they are used in a generic and descriptive sense only and not for purposes of limitation.

What is claimed is:

1. A method of providing security for a communications network comprising:
monitoring, using a programmed computer processor circuit, data at an edge of the communications network, that is outside a backbone of the communications network, the data being received at the edge from outside the backbone of the communications network;
determining, at the edge, that the data being monitored at the edge comprises a security threat to the communications network;
reporting the data determined at the edge to be the security threat to a central management system associated with the backbone; and
blocking the data at the edge responsive to determining at the edge that the data is the security threat to the communications network;
wherein blocking comprises blocking data directed to a victim at the edge for a first type of security threat and blocking data directed to the victim at the backbone for a second type of security threat, the first and second types of security threats being different;
wherein the first type of security threat is a relatively low bandwidth aggregated security threat and the second type of security threat is a relatively high bandwidth security threat.

2. A method according to claim 1, wherein the edge of the communications network comprises a device operated under control of an internet service provider controlling the backbone, the device being logically located at an outermost position of the communications network immediately adjacent to a sub-network operated by a customer of the internet service provider.

3. A method according to claim 1, wherein the edge of the communications network comprises a peer router operated under control of an internet service provider controlling the backbone, the peer router interfacing the communications network of the internet service provider to a network under control of another internet service provider.

4. A method according to claim 1, wherein monitoring data comprises:
monitoring source data at a first sub-network connected to the backbone as the source data is received at a first edge and monitoring aggregated data including the source data upon receipt at a second sub-network located at a second edge of the communications network after traversing the backbone; and
wherein determining comprises determining at the second edge that the aggregated data comprises the security threat.

5. A method according to claim 1, wherein reporting further comprises:
receiving information associated with the data determined to be the security threat at the central management system;
modifying a security policy controlled by the central management system to provide an updated security policy;
transmitting the updated security policy to the edge;
receiving the updated security policy at the edge; and
blocking the data at the edge responsive to receiving the updated security policy.

6. A method according to claim 5, wherein determining comprises determining that the data is associated with an unsolicited data transfer to the victim.

7. A method according to claim 5, wherein determining comprises determining that the data is associated with a port scan of the victim.

8. A method according to claim 5, wherein the updated security policy comprises an instruction to the edge to block data directed to an address associated with the victim of the security threat.

9. A system for providing security for a communications network comprising:
an edge monitor circuit to monitor data at an edge of the communications network, that is outside a backbone of the communications network, the data being received at the edge from outside the backbone of the communications network, to determine, at the edge, that the data being monitored at the edge comprises a security threat to the communications network, to report the data determined at the edge to be the security threat to a central management system associated with the backbone, and to block the data at the edge responsive to determining at the edge that the data is the security threat to the communications network;

wherein the edge monitor circuit is further to block data directed to a victim at the edge for a first type of security threat and blocking data directed to the victim at the backbone for a second type of security threat, the first and second types of security threats being different;

wherein the first type of security threat is a relatively low bandwidth aggregated security is a relatively high bandwidth security threat.

10. A system according to claim 9, wherein the edge monitor circuit comprises a device operated under control of an internet service provider controlling the backbone, the device being logically located at an outermost position of the communications network immediately adjacent to a sub-network operated by a customer of the internet service provider.

11. A system according to claim 9, wherein the edge monitor circuit comprises a peer router operated under control of an internet service provider controlling the backbone, the peer router interfacing the communications network of the internet service provider to a network under control of another internet service provider.

12. A system according to claim 9, wherein the edge monitor circuit is further to monitor source data at a first sub-network connected to the backbone as the source data is received at a first edge and to monitor aggregated data including the source data upon receipt at a second sub-network located at a second edge of the communications network after traversing the backbone; and wherein the edge monitor circuit is further to determine at the second edge that the aggregated data comprises the security threat.

13. A system according to claim 9, wherein the central management system is further to receive information associated with the data determined to be the security threat at the central management system, to modify a security policy controlled by the central management system to provide an updated security policy, and to transmit the updated security policy to the edge; and wherein the edge monitor circuit is further to receive the updated security policy at the edge and to block the data at the edge responsive to receiving the updated security policy.

14. A system according to claim 13, wherein the edge monitor circuit is further to determine that the data is associated with an unsolicited data transfer to a victim.

15. A system according to claim 13, wherein the edge monitor circuit is further to determine that the data is associated with a port scan of the victim.

16. A system according to claim 13, wherein the updated security policy comprises an instruction to the edge monitor circuit to block data directed to an address associated with a victim of the security threat.

17. A computer program product for providing security for a communications network, the computer readable program product comprising a non-transitory computer readable storage medium having computer readable program code embodied therein, the computer readable program code comprising:

computer readable program code that is to monitor data at an edge of the communications network, that is outside a backbone of the communications network, the data being received at the edge from outside the backbone of the communications network;

computer readable program code that is to determine, at the edge, that the data being monitored at the edge comprises a security threat to the communications network;

computer readable program code that is to report the data determined at the edge to be the security threat to a central management system associated with the backbone; and computer readable program code that is to block the data at the edge responsive to determining at the edge that the data is the security threat to the communications network;

wherein the computer readable program code to block comprises computer readable program code to block data directed to a victim at the edge for a first type of security threat and blocking data directed to the victim at the backbone for a second type of security threat, the first and second types of security threats being different;

wherein the first type of security threat is a relatively low bandwidth aggregated security threat and the second type of security threat is a relatively high bandwidth security threat.

* * * * *

UNITED STATES PATENT AND TRADEMARK OFFICE
CERTIFICATE OF CORRECTION

| | | |
|---|---|---|
| PATENT NO. | : 8,726,380 B2 | Page 1 of 1 |
| APPLICATION NO. | : 13/663202 | |
| DATED | : May 13, 2014 | |
| INVENTOR(S) | : de los Reyes et al. | |

It is certified that error appears in the above-identified patent and that said Letters Patent is hereby corrected as shown below:

In the Claims:
Column 9, Claim 9, Line 15:
Please correct "bandwidth aggregated security is a"
    to read -- bandwidth aggregated security threat and the second type of security
        threat is a --

Signed and Sealed this
Seventh Day of October, 2014

Michelle K. Lee
*Deputy Director of the United States Patent and Trademark Office*